United States Patent [19]

Kolombos et al.

[11] 3,888,889

[45] June 10, 1975

[54] PROCESS FOR PROPYLENE OXIDE

[75] Inventors: Alexander John Kolombos, Sutton; Colin Christopher McCain, Horley; Eric Andrew Porter, Sutton, all of England

[73] Assignee: BP Chemicals International Limited, London, England

[22] Filed: June 18, 1973

[21] Appl. No.: 370,923

[30] Foreign Application Priority Data
June 27, 1972 United Kingdom............... 29954/72

[52] U.S. Cl....................... 260/348.5; 260/348.5 V
[51] Int. Cl............................................. C07d 1/12
[58] Field of Search............... 260/348.5 R, 348.5 V

[56] References Cited
FOREIGN PATENTS OR APPLICATIONS 1,506,303  11/1967  France
587,584   4/1947  United Kingdom

OTHER PUBLICATIONS

Chemical Abstracts, Vol. 74, (1971), 63839d.

Primary Examiner—Norma S. Milestone
Attorney, Agent, or Firm—Brooks Haidt Haffner & Delahunty

[57] ABSTRACT

This case relates to a process for the production of propylene oxide by oxidising propylene in the presence of an elemental silver catalyst which is modified on the surface by an additive which is a compound of a group VB or Group VIB metal.

21 Claims, No Drawings

PROCESS FOR PROPYLENE OXIDE

The invention relates to a process for the production of olefin oxides and in particular to a process for the production of propylene oxide.

The production of propylene oxide by direct oxidation of propylene with molecular oxygen in the presence of a silver catalyst is known. The main product of this direct oxidation is carbon dioxide, the olefin oxide being obtained only in selectivities of the order of 5% and yields of the order of 3% based on the propylene fed to the oxidation.

It is an object of the present invention to provide a process for the production of propylene oxide by the direct oxidation of propylene in which the yields and/or selectivities of propylene oxide formation are substantially increased over those obtained hitherto.

Accordingly the present invention is a process for the production of propylene oxide comprising reacting propylene and a molecular oxygen containing gas at an elevated temperature in the presence of a catalyst composition comprising elemental silver modified by an additive which is a compound of a metal selected from Group VB and VIB of the Periodic Table.

The process according to the present invention may conveniently be carried out in the vapour phase by passage of a gaseous mixture of propylene and a molecular oxygen containing gas, at an elevated temperature over a bed of supported or unsupported catalyst in the form of, for example, granules, discs or pellets.

The amount of propylene in the gaseous mixture may vary within moderately wide limits, for example, between 1 and 90%, preferably between 2 and 20% or between 60 and 80% by volume, but care must be taken to avoid the formation of explosive mixtures.

The gaseous reaction mixture may also contain an inert gaseous diluent, e.g. argon, helium or nitrogen and, in the latter instance, the molecular oxygen containing gas may be conveniently supplied as air.

The amount of the inert gaseous diluent in the gaseous mixture may vary within the range 0 to 97 preferably 30 to 70%.

The reaction temperature may be in the range 100° to 400°C preferably from 180° to 300°C. The process may also be carried out under pressures ranging from atmospheric to about 20 atmospheres gauge.

The contact time may be, for example, in the range 0.1 to 60 seconds and preferably about 2 to 20 seconds.

The process according to the present invention may also be carried out in the liquid phase by introducing propylene into a reaction zone containing a water immiscible organic solvent e.g. benzene or dimethyl phthalate, carying a solid suspension of catalyst and thereafter passing a molecular oxygen containing gas e.g. air through the solvent to oxidise the propylene.

The elemental silver catalyst may be prepared by any conventional known method, for example, precipitation of silver oxide from a solution of a suitable silver salt e.g. silver nitrate, followed by reduction of the oxide with a suitable reducing agent e.g. glucose, to produce metallic silver powder. This powder may thereafter be used as such compressed into pellets or discs for use in the process or first supported on an inert material such as alumina, pumice, silicon carbide or pure silica thereafter compressed into a suitable form. Alternatively, the silver catalyst may be prepared by impregnating the support with a solution of a silver compound, evaporating off the solvent and reducing the compound to elemental silver.

According to the present invention the silver catalyst is modified by an additive selected from a Group VB or Group VIB metal compound. This modification takes the form of covering at least partially, the surface of the elemental silver with the metal compound. It is believed that the essential catalytic surface is metallic silver partially covered with the metal compound. Vanadium, chromium, molybdenum tungsten, niobium or tantalum are the preferred metals. The compounds of these metals are such that the metal could either be in the anionic or cationic portion of the compound. These compounds are suitably the halides, chlorides and bromides being preferred. Vanadium trichloride, chromium trichloride, chromyl chloride, molybdenum pentachloride and tungsten hexachloride are particularly suitable. Other compounds where the metal is in the anionic portion such as potassium chromates and dichromates may also be used. The silver catalyst may be modified by treating the catalyst in the form of pellets or discs with a solution of the suitable metal compound. The feature of the invention is that the activity and selectivity of the catalyst is enhanced by using a very limited amount of the metal compound as additive. Too much of the additive deactivates the catalyst and makes it unselective. The amount of the additive is suitably between $1 \times 10^{-6}$ and $100 \times 10^{-6}$ gram moles per gram of silver having a surface area of 1 square metre. The optimum amount of additive metal to be added to the silver catalyst would depend upon the additive and the surface area of the silver catalyst used. For example, when the metal in the cationic portion of the metal compound additive, it is suitably between $1 \times 10^{-6}$ and $20 \times 10^{-6}$ gram moles per gram of silver having a surface area of one square metre. The surface area of the elemental silver in the catalyst composition may be up to 120 m²/gram. The surface area of precipitated silvers are commonly in the range of 0.1 to 0.7 m²/g. Correspondingly, the upper limit of the additive metal would be in the range of $10 \times 10^{-6}$ to $70 \times 10^{-6}$g moles of additive/g silver respectively.

Dt is found that by use of modified silver catalyst in accordance with the present invention yields of propylene oxide of 10% or more based on the propylene fed may be obtained.

At low conversions of propylene, selectivities to propylene oxide as high as 52% may be obtained.

The propylene oxide produced by the process of the present invention may be recovered from the reaction mixture by known methods, for example by water scrubbing, by scrubbing with aqueous glycol, by passing the reaction gases through cooled ethanol to condense the oxide etc., and thereafter recovering the oxide by distillation.

The process of the present invention is described in more detail with reference to the following examples in which the surface area of silver is in the range 0.1–0.7 m²/g.

EXAMPLE 1

A silver catalyst modified with molybdenum pentachloride was prepared.

213g of silver nitrate and 27 g of dextrose were dissolved in 2700 ml of water. 150g of potassium hydroxide were dissolved in 150 ml of water and added dropwise to the silver nitrate solution. The reduction of the precipitated silver oxide was completed by stirring for 45 minutes at room temperature and then heating to 70°–75°C during the course of a further 45 minutes. The silver powder formed was filtered and washed with cold water until the washings were neutral to phenol phthalein indicator. The silver was oven-dried at 120°C and subsequently screened to pass a B.S.S. 16 mesh sieve. The silver prepared by this recipe had a surface area in the region of 0.1 to 0.7 m²/g.

0.515 g of molybdenum pentachloride ($MoCl_5$) was dissolved in 100 ml of absolute alcohol. 10 ml of this solution were slowly added to 64 g of the precipitated silver stirred as a slurry in 100 ml of absolute alcohol. The mixture was stirred for 4 hours and the alcohol removed by slow evaporation on a hot plate.

The catalyst after over-drying at 120° was powdered to pass through B.S.S. 60 mesh sieve and pressed into 1⅜ inch diameter discs using a ring press operating at 3 tons. The discs were subsequently broken down and the particles screened to a range of B.S.S. 5–22 mesh.

A glass helical tube with a 6 mm bore was used for the reactor. The helix has 14 turns covering a distance of 20 cm and an outside diameter of 4 cm. A 23 ml portion of the silver/molybdenum pentachloride was inserted into the reactor.

The catalyst (as prepared above) was tested for the oxidation of propylene using a feed composition of argon:oxygen:propylene of 83.1:14.3:2.6 and a contact time of 15.2 seconds. The temperature of the catalyst was increased over a period of several hours from 227° to 250°C. At 250°C the yield of propylene oxide on propylene fed was 8.2% for a propylene conversion of 76%.

It was found that the selectivity of the catalyst was improved by adding small quantities of 1,2-dichloroethane to the feed gases for a short time. Approximately 0.3% by volume of 1,2-dichloroethane was added to the feed gases for 13 minutes when the yield of propylene oxide was 9.1% for a propylene conversion of 49%. The catalyst retained its improved selectivity for some hours after the addition of dichloroethane had ceased.

The surface area of the catalyst was determined after use in the catalytic tests to be 0.15 m²/g. For a monolayer coverage of silver of 0.15 m²/g surface area $3 \times 10^{-6}$ g atoms additive /g Ag would be required. The catalyst was prepared with $0.295 \times 10^{-6}$ g moles $MoCl_5$/g Ag equivalent to a 0.1 monolayer coverage of the silver with molybdenum. Since the surface area of the silver often declines with use the initial coverage of the silver with molybdenum was probably less than 0.1.

COMPARATIVE EXAMPLE

Silver catalysts modified with different amounts of molybdenum pentachloride were prepared and tested for the oxidation of propylene (see Table 1). It was found where the molybdenum pentachloride coverage of the silver surface was low that active catalysts selective for propylene oxide were obtained. The higher coverages gave catalysts which were either inactive or had very low activity.

EXAMPLE 2

A silver catalyst modified with chromium trichloride was prepared.

10 ml of a solution of chromium trichloride containing 0.1599 g $CrCl_3.6H_2O$ per 100 ml of water were added to a stirred slurry of 61.4 g of silver (prepared as in Example 1) in 100 ml of water over a period of 10 minutes. The suspension was stirred for 2 hours and the water evaporated off using a rotary evaporator.

After drying for 16 hours at 120°C, the powder was sieved to pass B.S.S. 60 mesh and pressed into 1⅜ inch diameter discs using a ring press operating at 3 tons. The discs were broken down to give particles having a B.S.S. mesh range of 5–22.

The catalyst was tested using a feed composition of argon:oxygen:propylene of 83.0:14.6:2.4 and a contact time of 3.7 seconds. At 240°C, the yield of propylene oxide was 9.3% on the propylene fed for a propylene conversion of 62.9%. After dosing the catalyst with a small quantity of 1,2-dichloroethane the propylene oxide yield was 10.1% for a 45.3% propylene conversion. The carbon dioxide yield fell from 49.8 to 31.8%.

Other tests for the oxidation of propylene at different reaction temperatures and feed conditions for this catalyst are given in Table 2.

Two further $Ag/CrCl_3$ catalyst of differing compositions were prepared from the same batch of silver. The silver was precipitated as described in Example 1 and had a surface area of 0.24 m²/g. The catalysts were prepared as in the method described above.

The two catalysts, which had mole ratios of $Ag:CrCl_3$ of 9688:1 (equivalent to a 0.20 monolayer coverage of the silver surface by Cr) and 6595:1 (equivalent to a 0.29 monolayer coverage of the silver surface by Cr), were active and selective for the formation of propylene oxide. Details of tests on these catalysts are given in Table 2.

These tests indicate that the degree of coverage of the silver surface by chromium trichloride is critical if active and selective catalysts are to be prepared.

EXAMPLE 3

A silver catalyst modified with vanadium trichloride was prepared.

10 ml of a solution containing 0.204 g of $VCl_3$ per 100 ml of absolute alcohol were added dropwise to a stirred slurry of 65.4 g of silver (prepared as in Example 1) in 100 ml of absolute alcohol. The mixture was stirred for two hours and the alcohol removed by evaporation on a hot plate.

After drying for 16 hours at 120°C the powder was sieved to pass B.S.S. mesh 60 and pressed into 1⅜ inch diameter discs using a ring press operating at 3 to 3½ tons. The discs were broken down to give particles in the B.S.S. mesh range 5–22.

The catalyst was tested for the oxidation of propylene with a feed composition of argon:oxygen:propylene of 83.0:14.5:2.5 and a contact time of 3.9 seconds. At 213°C the yield of propylene oxide was 1% on the propylene fed and the selectivity 38%.

Increasing the reaction temperature to 229°C increased the propylene oxide yield to 2.1% and the selectivity to 48.5%.

Tests for the oxidation of propylene on this and two other $Ag/VCl_3$ catalysts are given in Table 3.

EXAMPLE 4

A silver catalyst modified with chromyl chloride was prepared.

0.1470 g of chromyl chloride ($CrO_2Cl_2$) was dissolved in 100 ml of acetone. 10 ml of this solution were added dropwise to a stirred slurry of 74.7 g of precipitated silver in 100 ml of acetone. The mixture was stirred for three hours and the solvent removed on a rotary evaporator. The catalyst was dried at 120°C, screened to pass B.S.S. 60 mesh and pressed into 1⅜ inch diameter discs on a ring press at 3 tons. The discs were broken down into pellets with a range of B.S.S. 5 to 22 mesh.

The catalyst was tested with a feed composition of argon:oxygen:propylene of 83.3:13.4:3.3 and a contact time of 15.4 seconds. At 256°C the yield of propylene oxide was 4.0% on the propylene fed for a propylene conversion of 56.2%. The selectivity of the catalyst was improved by dosing with 1,2-dichloroethane. At the same temperature the propylene oxide yield was 4.2% at a 17.2% conversion of propylene. The efficiency of propylene oxide formation based on the propylene converted is 24.4% which is substantially higher than that obtained with an unmodified silver catalyst.

EXAMPLE 5

A silver catalyst modified with tungsten hexachloride was prepared. 55 ml of a solution containing 0.5797 g of $WCl_6$ per 100 ml of absolute alcohol were added slowly dropwise to a stirred slurry of 68.4 g of precipitated silver (prepared as in Example 1) in 100 ml of absolute alcohol. The mixture was stirred for 3 hours and the solvent removed using a rotary evaporator. After drying for 16 hours at 120°C the catalyst powder was sieved to pass B.S.S 60 mesh and pressed into 1⅜ inch diameter discs on ring press at 3 tons. The discs were broken down into pellets in the B.S.S. mesh range 5–22 for testing in the catalytic reactor.

The catalyst was tested using a feed composition helium:oxygen:propylene of 88.3:7.6:6.1 and a contact time of 12 seconds. At 260°C the yield of propylene oxide was 1.2% on propylene fed at a selectivity of 25%. In a stainless-steel reactor at 100 p.s.i.g. using a feed composition nitrogen:oxygen:propylene of 52.9:44.5:2.6 at 12 seconds contact time, a propylene oxide yield of 6.9% was obtained at a selectivity of 22.6% at 248°C.

Tests for the oxidation of other $Ag/WCl_6$ catalysts are given in Table 4.

EXAMPLE 6

A silver catalyst modified with potassium chromate was made. 5 ml of a solution containing 0.0780 g of $K_2CrO_4$ per 100 ml of distilled water were added dropwise to a stirred slurry of 15 g of precipitated silver (surface area 0.62 m²/g) in 75 ml of distilled water. The mixture was stirred for two hours and the water evaporated off using a rotary evaporator. The catalyst was dried at 110°C and screened to pass through a B.S.S. 16 mesh sieve.

The catalyst was tested in a quartz annular reactor with a feed composition of argon:oxygen:propylene of 17.8:74.3:7.9 and a contact time of 3.9 seconds. After dosing the catalyst at 238°C with a small amount of 1,2-dichloroethane the yield of propylene oxide was 3.8% at a selectivity of 29.3%.

Other silver catalysts modified with different amounts of potassium chromate were prepared and tested for the oxidation of propylene. Results of these tests are given in Table 5. By careful dosing of these catalysts with 1,2-dichloroethane, 1,1,2-trichloroethene or 3-chloropropene it was possible to obtain selectivities for propylene oxide of up to 45%.

EXAMPLE 7

A silver/sodium chromate catalyst was made by adding 10 ml of a solution containing 0.0505 g of $Na_2CrO_4$ per 100 ml of distilled water to a stirred slurry of 15 g of precipitated silver in 50 ml of water. After stirring the mixture for two hours the water was evaporated off and the catalyst dried at 120°C. The surface area of the silver before being modified was 0.49 m²/g. The monolayer coverage of the silver surface by Cr was 0.21.

The catalyst was tested with a feed composition of argon:oxygen:propylene of 35.2:56.0:8.8 and a 4.4 second contact time. At 224°C, after treating the catalyst with 1,2-dichloroethane, the propylene oxide yield was 1.3% and the corresponding selectivity 29.4%. Increasing the reaction temperature to 235°C gave a 2.5% yield at a 29.1% selectivity.

EXAMPLE 8

A silver/potassium dichromate catalyst was prepared as in the method described in Example 7 with $1.40 \times 10^{-6}$ g moles $K_2Cr_2O_7$/g Ag and using powdered silver of surface area 0.62 m²/g. This is equivalent to 0.23 monolayer coverage of the silver with chromium.

The catalyst on treatment with 1,2-dichloroethane at 232°C gave a 1.1% yield of propylene oxide at a selectivity of 33.5% with a feed composition $Ar:O_2:C_3H_6 = 16.6:75.4:8.0$ and a 4.1 second contact time.

EXAMPLE 9

A silver/barium chloride/potassium chromate catalyst was made and tested.

0.0790 g of $BaCl_2.2H_2O$ was dissolved in 100 ml of distilled water. 10 ml of this solution were added dropwise to a stirred slurry of 15 g of silver powder (surface area 0.49 m²/g) in 75 ml of distilled water. After stirring for 2 hours, the water was removed on a rotary evaporator and the $Ag/BaCl_2$ dried at 110°C for 16 hours. The $Ag/BaCl_2$ was then re-slurried with 75 ml of distilled water and 5 ml of a $K_2CrO_4$ solution containing 0.0634 g per 100 ml of water added. After stirring for 2 hours the catalyst was dried as before.

The powdered catalyst was tested in a quartz annular reactor, at 198°C with a feed composition of $Ar:O_2:C_3H_6 = 42:50:8$ and a 4 second contact time the propylene oxide yield was 1.2% at a selectivity of 22.2% after the catalyst had been dosed with allyl chloride.

Other catalysts of the types $Ag/M_yCl_z/K_2CrO_4$ and $Ag/H_xM_yCl_z/K_2CrO_4$ were prepared as in the method described above and tested for the oxidation of propylene. Results of these tests are given in Table 6.

EXAMPLE 10

A $Ag/CrBr_3$ catalyst was prepared by adding 5 ml of a solution containing 0.5488 g of $CrBr_3 6H_2O$ in 100 ml of distilled water to 70 g of powdered silver (surface area 0.57 m²/g) stirred as a slurry in 100 ml of water. After 2 hours stirring, the water was removed using a rotary evaporator and the catalyst dried at 120°C for 16 hours. The catalyst was comminuted to pass B.S.S. 60 mesh and pressed at 3 tons pressure into 1⅜ inch diameter discs. The discs were broken to give particles in the B.S.S. mesh range 5–22 for catalytic testing in a helical reactor.

On stream the catalyst gave stable selectivities for propylene oxide of about 18%. At 250°C with a feed composition of $Ar:O_2:C_3H_6 = 27.3:70.4:2.3$ and a 7.6 second contact time the propylene oxide yield was 6%.

By dosing the catalyst with either 1,2-dichloroethane (E.D.C) or 1,2-dibromoethane it was possible to deactivate the catalyst and improve the selectivity for propylene oxide. Using a feed composition $Ar:O_2:C_3H_6 = 34.7:62.9:2.4$ and a 7.7 second contact time the propylene oxide selectivity increased from 16.6 to 22.1% on dosing the catalyst with EDC at 251°C. The yields of carbon dioxide and propylene oxide were 36.2% and 7.2% respectively before and 16.0% and 4.5% respectively after treatment with EDC. At 271°C the propylene oxide yield was 11.7% at a 15.2% selectivity.

EXAMPLE 11

Silver catalysts modified with two of the halides of Group VB and/or Group VIB metals were made and found to be selective for the propylene oxide reaction. The catalysts were prepared by the method described in Example 9. Results of the tests on these catalysts are given in Table 7.

EXAMPLE 12

Silver catalysts modified with tantalum pentachloride, niobium pentachloride and niobium pentabromide were prepared. The catalysts were made by the dropwise addition of ethanolic solutions of the appropriate halide into stirred ethanolic slurries of precipitated silver. The mixtures were stirred for some 2 hours and the ethanol removed using a rotary evaporator. After drying overnight at 120°C the catalysts were screened to pass B.S.S. 60 mesh and pressed into 1⅜ inch diameter discs with a ring press operating at 3 tons. The discs were broken into particles having a B.S.S. mesh range of 5–22 for catalytic testing.

The results of tests on these catalysts are given in Table 8.

EXAMPLE 13

A catalyst was prepared by physically mixing equal volumes of an Ag/CrCl$_3$ catalyst (prepared as in Example 2) and an Ag/HCl/K$_2$CrO$_4$ catalyst (prepared as in Example 9) to give a catalyst containing monolayer coverages, $CrCl_3 = 0.65$, $K_2CrO_4 = 0.22$, $HCl = 0.5$. The catalyst was kept on stream for 120 hours and examined with a wide range of feed compositions from 8% $C_3H_6$, 14% $O_2$ to 60% $C_3H_6$ 40% $O_2$. A constant selectivity to propylene oxide of 38–42% was maintained throughout the lift test. Various organic halide additives were tested, 1,2-dichloroethane, 1,2-dibromoethane, chlorobenzene and 3-chloropropene, but only the latter gave small improvements in selectivity when fed over the catalyst. The maximum productivity to propylene oxide obtained with this catalyst was 0.3 g moles $C_3H_6O$/l catalyst/hour at a 38% selectivity.

EXAMPLE 14

A number of Ag/CrCl$_3$ (prepared as in Example 2) and Ag/HCl/Cr Cl$_3$ catalysts (prepared as in Example 9) have been examined and found to have high initial selectivities to propylene oxide, but which fall with time on stream. However, high selectivities (50–60%) were maintained for several hours with an Ag/CrCl$_3$ catalyst containing monolayer coverages of $CrCl_3 = 0.65$ and $K^+$ (present from the silver preparation) $= 0.27$. As the temperature was increased the selectivity could be held at 50% by careful dosing with 1,2-dichloroethane, but only at low propylene conversions. The same catalyst was tested using a high oxygen content in the feed composition (8% $C_3H_6$, 92% $O_2$) and found also to give a constant selectivity of 50% over a long period of time. However, high propylene conversions were obtained and the best yield of 4% at 50% selectivity gave a propylene oxide production rate of 0.28 g moles/ 1 catalyst/ hour. The propylene oxide yield and productivity appears to exhibit a first order dependence on the oxygen partial pressure, so that a high oxygen partial pressure in the feed gives the best propylene oxide productivity.

Some examples of the effect of time on stream and the feed gas composition on the selectivity to propylene oxide of certain Ag/CrCl$_3$ and Ag/HCl/CrCl$_3$ catalysts are given in Table 9.

TABLE 1

Tests on Silver Catalysts modified with Molybdenum Pentachloride

| Mole ratio Ag: MoCl$_5$ | g mol MoCl$_5$ per g Ag $\times 10^6$ | Reaction Temperature °C | Contact Time Sec. | Feed Composition % vol/vol Ar | O$_2$ | C$_3$H$_6$ | % Yield of propylene oxide | *% Selectivity for propylene oxide |
|---|---|---|---|---|---|---|---|---|
| 63,260:1 | 0.147 | 202 | 15.4 | 82.5 | 14.5 | 3.0 | 2.7 | 6.1 |
| 31,480:1 | 0.295 | 249 | 14.9 | 69.3 | 28.2 | 2.5 | 9.4 | 10.9 |
|  |  | 250 | 15.2 | 83.0 | 14.4 | 2.6 | 9.1 | 19.0 |
| 16,400:1 | 0.565 | 257 | 15.3 | 80.3 | 14.2 | 5.5 | 6.2 | 27.8 |
|  |  | 257 | 15.5 | 69.1 | 28.6 | 2.3 | 9.4 | 13.9 |
|  |  | 258 | 15.2 | 83.3 | 14.1 | 2.6 | 11.8 | 19.8 |
| 7,834:1 | 1.183 | 236 | 15.6 | 79.2 | 14.6 | 6.2 | 1.6 | 13.9 |
| 4,262:1 (c) | 2.175 | up to 293 | 17.4 | 83.1 | 14.7 | 2.2 | 0 |  |
| 2,423:1 (c) | 3.82 | up to 284 | 15.8 | 83.0 | 14.5 | 2.5 | 0 |  |
| 553:1 (c) | 16.8 | up to 351 | 16.2 | 83.3 | 14.2 | 2.5 | 0 |  |
| 59.7:1 (c) | 155 | up to 359 | 8.2 | 84.2 | 13.7 | 2.1 | 0 |  |

*Selectivity = $\dfrac{\text{Yield of product}}{\text{sum of yields of all products}} \times 100$ (c) Comparative example

TABLE 2

Tests on Silver Catalysts modified with Chromium Trichloride

| Mole ratio Ag: CrCl₃ | g mol CrCl₃ per g Ag ×10⁶ | Reaction Temperature °C | Contact time Sec. | Feed Composition % vol/vol | | | % Yield of propylene oxide | *% Selectivity for propylene oxide |
|---|---|---|---|---|---|---|---|---|
| | | | | Ar | O₂ | C₃H₆ | | |
| 9486:1 | 0.977 | 240 | 3.7 | 83.0 | 14.6 | 2.4 | 10.1 | 24.1 |
| | | 250 | 3.7 | 83.0 | 14.7 | 2.3 | 10.0 | 19.7 |
| | | 250 | 3.7 | 69.5 | 28.2 | 2.3 | 11.7 | 22.0 |
| 9688:1** | 0.957 | 220 | 8.7 | 68.3 | 29.1 | 2.6 | 3.9 | 22.8 |
| | | 222 | 8.8 | 55.7 | 41.7 | 2.6 | 5.5 | 30.9 |
| | | 221 | 8.9 | 34.0 | 63.4 | 2.6 | 7.8 | 33.4 |
| | | 220 | 8.9 | 0 | 97.4 | 2.6 | 8.8 | 34.8 |
| | | 240 | 8.6 | 34.5 | 63.0 | 2.5 | 10.7 | 30.6 |
| 6595:1** | 1.406 | 254 | 8.4 | 82.8 | 14.7 | 2.5 | 5.4 | 41.9 |
| | | 252 | 8.5 | 68.4 | 29.0 | 2.6 | 7.9 | 52.0 |
| | | 260 | 8.5 | 55.0 | 42.5 | 2.5 | 12.2 | 38.2 |

*Selectivity = $\frac{\text{yield of product}}{\text{sum of yields of all products}} \times 100$

***Helium was used as the inert gas for these catalysts

*Selectivity = $\frac{\text{yield of product}}{\text{sum of yields of all products}} \times 100$ (c) Comparative example

TABLE 3

Tests on Silver Catalysts modified with Vanadium Trichloride

| Mole ratio Ag: VCl₃ | g mol VCl₃ per g Ag × 10⁶ | Reaction temperature °C | Contact time sec. | Feed Composition % vol/vol | | | % Yield of propylene oxide | *% Selectivity for propylene oxide |
|---|---|---|---|---|---|---|---|---|
| | | | | Ar | O₂ | C₃H₆ | | |
| 9835:1 | 0.943 | 249 | 4.0 | 83.6 | 14.0 | 2.4 | 3.9 | 37.1 |
| 4675:1 | 1.983 | 229 | 3.9 | 83.0 | 14.5 | 2.5 | 2.1 | 48.5 |
| 66.3:1 (c) | 140.00 | up to 373 | 15.5 | 82.7 | 14.4 | 2.9 | 0 | — |

TABLE 4

Tests on silver catalysts modified with tungsten hexachloride at atmospheric pressure and at 100 p.s.i.g.

| Mole ratio Ag: WCl₆ | g mol WCl₆ per g Ag × 10⁶ | Reaction temperature °C | Contact time sec | Feed Composition % v/v | | | | % Yield propylene oxide | % Selectivity for propylene oxide | Pressure |
|---|---|---|---|---|---|---|---|---|---|---|
| | | | | He | N₂ | O₂ | C₃H₆ | | | |
| 8,678:1 | 1.07 | 248 | 11.8 | — | 52.95 | 44.47 | 2.58 | 6.9 | 22.6 | 100 p.s.i.g. |
| 8,678:1 | 1.07 | 260 | 12.1 | 86.26 | — | 7.67 | 6.07 | 1.2 | 25.0 | atmospheric |
| 18,948:1 | 0.49 | 218 | 10.0 | 51.29 | — | 45.00 | 3.71 | 5.3 | 16.7 | atmospheric |
| 1,710:1 (c) | 5.43 | 295 | 10.0 | 53.35 | — | 43.34 | 3.31 | 0 | 0 | atmospheric |

Tests at atmospheric pressure were carried out in a glass reactor, tests at 100 p.s.i.g. were conducted in a stainless-steel reactor.
(c) Comparative example

TABLE 5

Tests on Silver Catalysts modified with Potassium Chromate

| G. mol K₂CrO₄ per g Ag × 10⁶ | Surface area of silver before modification | Monolayer coverage of silver surface by Cr | Reaction temperature °C | Contact time Sec. | Feed composition % vol/vol | | | % Yield of propylene oxide | % Selectivity for propylene oxide | Halogenated molecule used in treatment of catalyst |
|---|---|---|---|---|---|---|---|---|---|---|
| | | | | | Ar | O₂ | C₃H₆ | | | |
| 1.34 | 0.62 | 0.11 | 238 | 3.9 | 17.8 | 74.3 | 7.9 | 3.8 | 29.3 | EDC |
| | | | 254 | 4.1 | 42.1 | 49.9 | 8.0 | 6.5 | 22.1 | EDC |
| | | | 268 | 4.0 | 17.8 | 73.8 | 8.4 | 8.0 | 20.3 | TCE |
| 1.88 | 0.42 | 0.22 | 216 | 2.0 | — | 92.0 | 8.0 | 1.9 | 28.2 | EDC |
| | | | 226 | 2.0 | — | 92.0 | 8.0 | 0.9 | 45.0 | 3-CP |
| | | | 228 | 2.0 | — | 92.0 | 8.0 | 1.3 | 42.8 | 3-CP |
| | | | 221* | 3.6 | — | 91.2 | 8.8 | 4.9 | 29.2 | EDC |
| 4.81 | 0.31** | 0.77 | 245 | 3.9 | 17.2 | 74.6 | 8.2 | 4.7 | 31.7 | EDC |

TABLE 5 — Continued

Tests on Silver Catalysts modified with Potassium Chromate

| G. mol $K_2CrO_4$ per g Ag $\times 10^6$ | Surface area of silver before modification | Monolayer coverage of silver surface by Cr | Reaction temperature °C | Contact time Sec. | Feed composition % vol/vol Ar | $O_2$ | $C_3H_6$ | % Yield of propylene oxide | % Selectivity for propylene oxide | Halogenated molecule used in treatment of catalyst |
|---|---|---|---|---|---|---|---|---|---|---|
| 9.61 | 0.29** | 1.66 | 242 | 4.2 | 40.3 | 51.1 | 8.6 | 4.0 | 34.5 | Further EDC |
|  |  |  |  |  |  |  |  | 3.4 | 26.4 | EDC |
|  |  |  | 240 | 4.2 | 14.2 | 77.0 | 8.8 | 2.6 | 34.8 | Further EDC |
|  |  |  |  |  |  |  |  | 3.4 | 37.7 | EDC |

*Test at 100 psig. conducted in a stainless steel reactor
**Surface area of used catalyst
EDC 1,2-dichloroethane
TCE 1,1,2-trichloroethene
3-CP 3-chloropropene (allyl chloride)

TABLE 6

Tests on Silver - Potassium Chromate Catalysts modified with an Inorganic Chloride

| Catalyst | Surface Area of Silver Before Modifn. $m^2/g$ | g mol add./g Ag Inorg. $Cl^-$ $\times 10^6$ | $K_2CrO_4$ $\times 10^6$ | Coverage of Ag Surface by Cation (of inorg. $Cl^-$) | Chromium (of $K_2CrO_4$) | Reaction Temp. °C | Contact time Sec. | Feed Compn. % vol/vol Ar | $O_2$ | $C_3H_6$ | % Yield of $C_3H_6O$ | % Select. for $C_3H_6O$ |
|---|---|---|---|---|---|---|---|---|---|---|---|---|
| Ag/CrCl$_3$/K$_2$CrO$_4$** | 0.49 | 0.748 | 2.16 | 0.076 | 0.221 | 243 | 4 | 17 | 75 | 8 | 2.3 | 42.4 |
| Ag/KCl/K$_2$CrO$_4$ | 0.42 | 1.88 | 1.84 | 0.224 | 0.219 | 206 | 2 | — | 92 | 8 | 2.2 | 17.5 |
| Ag/H$_2$PtCl$_6$/K$_2$CrO$_4$* | 0.42 | 0.321 | 2.16 | 0.038 | 0.257 | 234 | 4 | 17 | 75 | 8 | 3.5 | 33.6 |
| Ag/HAuCl$_4$/K$_2$CrO$_4$* | 0.49 | 0.531 | 1.09 | 0.054 | 0.111 | 223 | 2 | — | 92 | 8 | 5.7 | 22.3 |
|  |  |  |  |  |  | 229 | 2 | — | 92 | 8 | 4.4 | 26.7 |
| Ag/HAuCl$_4$/K$_2$CrO$_4$* | 0.49 | 2.17 | 1.09 | 0.221 | 0.111 | 233 | 4 | 42 | 50 | 8 | 3.5 | 24.6 |
| Ag/HCl/K$_2$CrO$_4$* | 0.57 | 5.69 | 2.48 | 0.499 | 0.217 | 230 | 2 | 42 | 50 | 8 | 4.5 | 35.0 |
|  |  |  |  |  |  | 250 | 2 | 42 | 50 | 8 | 9.3 | 25.0 |

The catalyst was treated with a halogenated molecule represented as
*1,2-dichloroethane 1,2-dichloroethane
**3-Chloropropene

TABLE 7

Tests on Silver Catalysts modified with two Group VB and / or Group VIB Metal Halides

| Catalyst | Surface Area of Ag before Modifn. $m^2/g$ | g mol metal halide per g Ag First Halide $\times 10^6$ | Second Halide $\times 10^6$ | Coverage of Silver Surface by metal of First Halide | Second Halide | Reaction Temp. °C | Contact Time Sec | Feed Composition % vol/vol Ar | $O_2$ | $C_3H_6$ | % Yield of $C_3H_6O$ | % Select. For $C_3H_6O$ |
|---|---|---|---|---|---|---|---|---|---|---|---|---|
| Ag/CrCl$_3$/CrBr$_3$ | 0.45 | 1.96 | 0.447 | 0.217 | 0.050 | 270 | 4.1 | 80.3 | 11.8 | 7.9 | 0.7 | 35.7 |
| Ag/CrCl$_3$/MoBr$_5$ | 0.50 | 1.34 | 0.193 | 0.134 | 0.019 | 226 | 7.8 | 83.1 | 14.4 | 2.5 | 4.6 | 33.8 |
|  |  |  |  |  |  | 249 |  |  |  |  | 12.0 | 30.0 |
| Ag/MoCl$_5$/VCl$_3$ | 0.7 | 0.519 | 0.973 | 0.037 | 0.069 | 229 | 5.8 | 75.4 | 20.9 | 3.7 | 3.0 | 36.9 |

TABLE 8

Tests on Silver Catalysts modified with Niobium and Tantalum Halides

| Halide | g. mol halide per g Ag $\times 10^6$ | Surface Area Of Ag Before Modifn. $m^2/g$ | Monolayer Coverage of Ag surface by metal | Reaction Temp. °C | Contact Time Sec. | Feed Composition % vol/vol He | $O_2$ | $C_3H_6$ | % Yield of Propylene Oxide | % Select. for $C_3H_6O$ |
|---|---|---|---|---|---|---|---|---|---|---|
| Nb Cl$_5$* | 0.666 | 0.35 | 0.095 | 190 | 4.1 | 68.2 | 29.3 | 2.5 | 0.9 | 22.4 |
| Ta Cl$_5$ | 0.780 | 0.35 | 0.111 | 182 | 8.7 | 68.3 | 29.1 | 2.6 | 1.3 | 15.1 |
| Nb Br$_5$** | 0.333 | 0.42 | 0.040 | 249 | 7.7 | 40.7+ | 56.7 | 2.6 | 6.8 | 16.1 |

The catalyst was treated with a halogenated molecule represented as
*1,2-dichloroethane
**1,1,2-trichloroethane
+Argon was used as the inert gas for this catalyst

TABLE 9

Effect of time on stream on the selectivity of Silver Catalysts modified with Chromic Chloride

| Catalyst | Surface Area of Ag Before Modifn. | g. moles of Addit./g Ag | | Coverage of Ag Surface by | | React. Temp °C | Cont. Time Sec. | Feed Composition | | | % $C_3H_6O$ Yield | % $C_3H_6O$ Select. | Hours on Stream |
|---|---|---|---|---|---|---|---|---|---|---|---|---|---|
| | | HCl ×$10^6$ | $CrCl_3$ ×$10^6$ | $K^+$ | $Cr^{3+}$ | | | $C_3H_6$ | $O_2$ | He | | | |
| Ag/HCl/$CrCl_3$ | 0.44 | 2.21 | 1.84 | 0.65 | 0.20 | 210 | 1.9 | 7.4 | 13.4 | 79.2 | 0.7 | 62 | 1 |
| | | | | | | 210 | 1.9 | 7.4 | 13.4 | 79.2 | 0.7 | 32 | 3 |
| Ag/$CrCl_3$ | 0.45 | — | 1.84 | 0.57 | 0.21 | 215 | 1.9 | 7.4 | 12.4 | 79.2 | 0.4 | 52 | 1 |
| | | | | | | 215 | 1.9 | 7.4 | 12.4 | 79.2 | 0.6 | 20 | 4 |
| Ag/$CrCl_3$ | 0.55 | — | 2.38 | 0.27 | 0.22 | 218* | 2.3 | 9.0 | 91.0 | — | 3.6 | 50 | 4 |
| | | | | | | 216* | 2.3 | 9.0 | 91.0 | — | 2.2 | 50 | 26 |
| | | | | | | 222* | 2.0 | 8.0 | 14.0 | 78.0 | 0.4 | 50 | 27 |
| | | | | | | 213 | 2.1 | 10.4 | 89.6 | — | 2.0 | 51 | 7 |
| | | | | | | 214* | 2.0 | 23.5 | 40.4 | 36.1/ | 0.2 | 49 | 25 |

*The catalyst was treated with 1,2-dichloroethane

We claim:

1. A process for the production of propylene oxide comprising reacting propylene and a molecular oxygen containing gas in the vapor phase at a temperature between about 180° to 300°C and at a pressure between 1 and 20 atmospheres in the presence of a catalyst composition comprising elemental silver modified on its surface by an additive which is a compound of a Group VB or Group VIB metal, the amount of said additive on the surface of said elemental silver is from $1 \times 10^{-6}$ to $100 \times 10^{-6}$ gram moles per gram of silver having a surface area of one square meter.

2. A process according to claim 1 wherein the gaseous reaction mixture contains an inert gaseous diluent in the range of 0 to 97% by volume selected from the group consisting of helium, nitrogen, and argon.

3. A process according to claim 1 wherein the amount of propylene in the gaseous mixture is between 2 and 20% or between 60 and 80% by volume.

4. A process according to claim 1 wherein the contact time of the reaction is in the range 0.1 to 60 seconds.

5. A process according to claim 1 wherein the metal in the Group VB metal compound is selected from vanadium, niobium and tantalum and in the Group VIB metal compound is selected from chromium, molybdenum and tungsten.

6. A process according to claim 1 wherein the Group VB or Group VIB metal in the additive is in the cationic portion of the metal compound.

7. A process according to claim 6 wherein the Group VB or Group VIB metal compound in the additive is a halide selected from a chloride and a bromide.

8. A process according to claim 7 wherein the Group VB metal halide is vanadium trichloride and the Group VIB metal halide is selected from chromium trichloride, chromyl chloride, molybdenum pentachloride and tungsten hexachloride.

9. A process according to claim 1 wherein the Group VB or Group VIB metal in the additive is in the anionic portion of the metal compound.

10. A process according to claim 9 wherein the metal compound is selected from an alkali metal chromate and an alkali metal dichromate.

11. A process according to claim 10 wherein the alkali metal is potassium.

12. A process according to claim 1 wherein the amount of additive on the surface of elemental silver is between $1 \times 10^{-6}$ and $20 \times 10^{-6}$ gram moles per gram of silver having a surface area of 1 square metre for an additive in which the metal is in the cationic portion of the metal compound.

13. A process according to claim 1 wherein the elemental silver in the catalyst composition has a surface area of up to 120 m² per gram.

14. A process according to claim 1 wherein the catalyst composition is supported on an inert material selected from alumina, pumice, silica and silicon carbide.

15. A process according to claim 1 wherein the propylene oxide produced is recovered from the reaction mixture by passing the reaction gases into a gas/liquid scrubbing agent to absorb the oxide, followed by distillation.

16. A process according to claim 15 wherein the scrubbing agent is selected from cooled ethanol, water, and an ester of ethylene glycol or propylene glycol.

17. A process according to claim 1 wherein the catalyst is activated by treatment thereof with a halogenated hydrocarbon selected from 1,2-dichloroethene, 1,1,2-trichloroethane and 3-chloropropene.

18. A process according to claim 1 wherein said additive is a compound of a Group VB metal.

19. A process according to claim 1 wherein said additive is vanadium trichloride, tantalum pentachloride, niobium pentachloride, or niobium pentabromide.

20. A process as claimed in claim 1 wherein said additive is a compound of a Group VIB metal.

21. A process as defined in claim 20 wherein said Group VIB metal compound is chromium trichloride, chromyl chloride, molybdenum pentachloride, tungsten hexachloride, sodium chromate, potassium chromate, potassium dichromate or chromyl bromide.

* * * * *

UNITED STATES PATENT OFFICE
CERTIFICATE OF CORRECTION

PATENT NO. : 3,888,889
DATED : June 10, 1975
INVENTOR(S) : ALEXANDER JOHN KOLOMBOS, COLIN CHRISTOPHER McCAIN, and ERIC ANDREW PORTER It is certified that error appears in the above-identified patent and that said Letters Patent are hereby corrected as shown below:

Col. 1, line 54, correct the spelling of "carrying"

Col. 2, line 43, "Dt" should read --It--

Col. 5, line 22, "55 ml" should read --5 ml--

Col. 8, line 6, correct the spelling of "life"

Col. 11 and 12, Table 6, heading reading

"Coverage
  of Ag
Surface by"

should be moved to the left and placed above heading reading:

"Cation
  (of
 inorg.
  Cl⁻)"

Col. 11, after Table 6, omit "1,2-dichloroethane", second occurrence, after the single asterisk (*).

Signed and Sealed this twenty-sixth Day of August 1975

[SEAL]

Attest:

RUTH C. MASON
Attesting Officer

C. MARSHALL DANN
Commissioner of Patents and Trademarks